United States Patent
Logan et al.

(10) Patent No.: US 6,754,062 B2
(45) Date of Patent: Jun. 22, 2004

(54) HYBRID CERAMIC ELECTROSTATIC CLAMP

(75) Inventors: Joseph Logan, Jamestown, RI (US); John R. Miller, Wappingers Falls, NY (US); Mahmood Naim, Salt Point, NY (US); Robert E. Tompkins, Millbrook, NY (US)

(73) Assignee: Praxair S.T. Technology, Inc., North Haven, CT (US)

( * ) Notice: Subject to any disclaimer, the term of this patent is extended or adjusted under 35 U.S.C. 154(b) by 0 days.

(21) Appl. No.: 10/085,571

(22) Filed: Feb. 27, 2002

(65) Prior Publication Data

US 2003/0165043 A1 Sep. 4, 2003

(51) Int. Cl.[7] .............................. H01T 23/00; H05F 3/00; H02N 13/00
(52) U.S. Cl. ....................... 361/234; 361/233
(58) Field of Search .................. 361/233–234

(56) References Cited

U.S. PATENT DOCUMENTS

| | | | |
|---|---|---|---|
| 5,055,964 A | 10/1991 | Logan et al. | 361/234 |
| 5,155,652 A | 10/1992 | Logan et al. | 361/234 |
| 5,191,506 A | 3/1993 | Logan et al. | 361/234 |
| 5,382,469 A | 1/1995 | Kubota et al. | 428/332 |
| 5,463,526 A * | 10/1995 | Mundt | 361/234 |
| 5,663,865 A | 9/1997 | Kawada et al. | 361/234 |
| 5,671,116 A | 9/1997 | Husain | 361/234 |
| 5,748,436 A | 5/1998 | Honma et al. | 361/234 |
| 5,880,922 A | 3/1999 | Husain | 361/234 |
| 5,903,428 A | 5/1999 | Grimard et al. | 361/234 |
| 5,909,355 A | 6/1999 | Parkhe | 361/234 |
| 5,998,320 A | 12/1999 | Yamada et al. | 501/98.4 |
| 6,028,022 A | 2/2000 | Ohashi | 501/152 |
| 6,104,596 A | 8/2000 | Hausmann | 361/234 |
| 6,108,189 A * | 8/2000 | Weldon et al. | 361/234 |
| 6,166,452 A | 12/2000 | Adams et al. | 307/10.1 |
| 6,174,583 B1 | 1/2001 | Yamada et al. | 428/67 |
| 6,261,708 B1 | 7/2001 | Ohashi et al. | 428/698 |
| 6,268,994 B1 | 7/2001 | Logan et al. | 361/234 |

* cited by examiner

Primary Examiner—Anthony Dinkins
Assistant Examiner—Eric W. Thomas
(74) Attorney, Agent, or Firm—Gerald L. Coon

(57) ABSTRACT

The invention is a hybrid chuck for securing workpieces with an electrostatic charge. The hybrid chuck includes a dielectric base for supporting the hybrid chuck. The dielectric base has a top surface and a conductive layer covers at least a portion of the top surface of the dielectric base. The conductive layer is conductive for receiving a current that creates an electrostatic charge and is non-metallic for maintaining the electrostatic charge without significant eddy current losses in the presence of dynamic electromagnetic fields. The top working surface covers the conductive layer and is flat for holding workpieces upon the receiving of the current to create the electrostatic charge in the conductive layer.

13 Claims, 3 Drawing Sheets

HYBRID CERAMIC ELECTROSTATIC CLAMP

FIELD OF THE INVENTION

This invention relates to the field of electrostatic clamps. In particular, this invention relates to the field of electrostatic chucks for securing semiconductor wafers.

BACKGROUND OF THE INVENTION

Over the years, designers have developed electrostatic chucks that use ceramics in combination with an embedded metallic conductor ("ceramic chucks"). The ceramic chuck holds an electrostatic charge that secures a substrate, such as a wafer in a semiconductor manufacturing chamber. These designs typically rely upon an adhesive-type bonding of the assembly to secure the metallic conductor within multiple ceramic layers and to form the ceramic chuck.

Logan et al., in U.S. Pat. No. 5,191,506, describe a ceramic electrostatic chuck that contains multilayer ceramic components supported on a metallic base. The disadvantage of this design is that the electrostatic chuck requires extended charging times to form an adequate electrostatic charge. Typically, this design requires at least about five seconds to store an adequate electrostatic charge. Similarly, this design typically requires at least about ten seconds to discharge the chuck and release the wafer. With the high costs often associated with semiconductor fabrication plants, decreasing the duration of wafer clamping and declamping cycles can measurably increase semiconductor manufacturers' equipment operating efficiency.

Logan et al., in U.S. Pat. No. 6,268,994, disclose a ceramic electrostatic chuck that relies upon a metal base. Unfortunately, the metal base allows electrostatic bridging between the two poles. This bridging within the metal base results in leakage between the electrodes and the base that can drain-off the stored charge that clamps the workpiece. In addition, this ceramic chuck also requires the extended charging and discharging cycle times experienced with other ceramic chucks.

Before ceramic chucks, most electrostatic chucks relied upon anodized aluminum as the insulator. Logan et al., in U.S. Pat. No. 5,055,964, describe anodized aluminum incorporated into an aluminum base to form an electrostatic chuck. This design forms a strong and effective clamp for most applications. But this chuck's anodized layer is prone to adsorbing water; and this adsorbed water holds an electrostatic charge. Unfortunately, it is difficult to discharge a polarized water-containing anodized layer; and this results in even greater times to discharge the chuck and release the workpiece.

Since ceramic chucks often have porosity that adsorbs water from the air, they often experience the same discharge problem as anodized chucks. The adsorbed water polarizes electrically in the chuck's applied electric field. This may occur slowly over long clamping times; and the polarized ceramic chuck does not de-polarize quickly during shorting of the electrodes to release the clamp. By this water-polarization mechanism, the electrostatic chuck can clamp a workpiece long after shorting the chuck's electrodes. If the electrostatic chuck operated only in a vacuum, then periodically drying out or "outgassing" the electrostatic chuck prior to use would solve the retained charge problem. But since some of these chucks operate in an air atmosphere, this is not a practical solution for many such applications where chucks' performance often degrade over time as they adsorb increasing amounts of water.

SUMMARY OF THE INVENTION

The invention is a hybrid chuck for securing workpieces with an electrostatic charge. The hybrid chuck includes a dielectric base for supporting the hybrid chuck. The dielectric base has a top surface and a conductive layer covers at least a portion of the top surface of the dielectric base. The conductive layer is conductive for receiving a current that creates an electrostatic charge and is non-metallic for maintaining the electrostatic charge without significant eddy current losses in the presence of dynamic electromagnetic fields. The top working surface covers the conductive layer and is flat for holding workpieces upon the receiving of the current to create the electrostatic charge in the conductive layer.

DETAILED DESCRIPTION

Figure 1A:
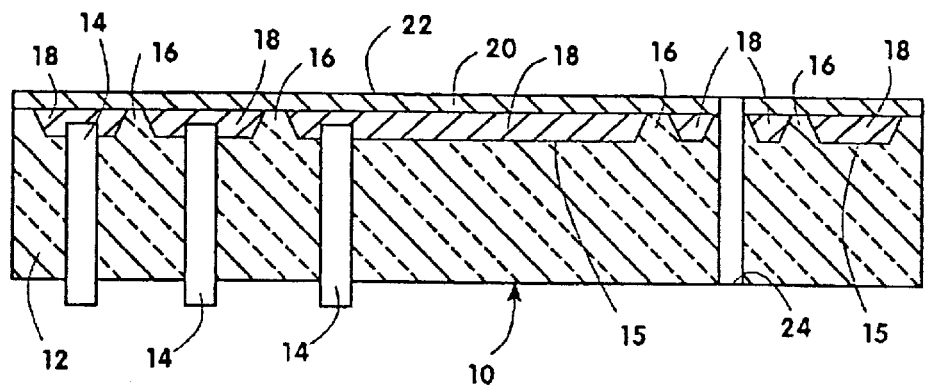
FIG. 1A is a schematic cross-sectional drawing of a multi-polar hybrid electrostatic chuck.

The combination of a dielectric base and non-metallic conductive layers provides a means of storing electrical charge sufficient to hold a semiconductor wafer in place for processing in air or in vacuum. This hybrid combination of dielectric and non-metallic conductive layers also facilitates rapid storing and discharging of an electrical charge from the electrostatic clamp.

The hybrid design can produce an electrostatic charge in about 10 milli-seconds and discharge in less than about 1 second. This represents a significant improvement in wafer clamping and declamping performance over earlier electrostatic chuck designs.

The chuck operates with the conductive layer configured as a mono-polar, bi-polar, tri-polar or other multi-polar configuration. The segmenting of the conductive electrode into distinct electrically isolated regions produces the desired number of poles for securing a wafer. For example, the conductive layer may include at least two poles separated by a dielectric material, such as the dielectric base. The electrostatic device advantageously contains segmented conductive electrodes positioned and proportioned to retain charge without developing any excessive currents in a clamped wafer. The base, conductor and top plate materials avoid excessive eddy current or "skin effect" losses during charging and discharging. The base materials is a dielectric that encapsulates and insulates the conductor. It is possible to construct dielectric components from polymers. However, polymeric materials tend to have less thermal stability and higher coefficients of thermal expansion than ceramic materials. Advantageously the base material is a dielectric ceramic. Most advantageously, the dielectric has a resistance on the order of at least about $10^{13}$, and typically on the order of $10^{13}$ to $10^{15}$ Ohm·cm. The ceramic material must also provide minimal generation of particulate in a vacuum. Alumina is an example of a material that provides excellent insulating properties with minimal particle generation under vacuum.

The intermediate conductive layer is also a non-metallic that does not support significant eddy currents when external electromagnetic fields are present that are dynamic. The electrode is a non-metallic material that has no significant eddy current or skin effect losses in the presence of any dynamic electromagnetic fields during any wafer processing. In fact, eddy current losses for the conductive layer are not measurable or detected. Advantageously, the conductive electrode is a ceramic. Most advantageously, the conductor has a resistance on the order of at least about 10 Ohm·cm and typically about 10 to 1000 Ohm·cm. An example of a conductive ceramic is titania-doped alumina. For example, alumina doped with about 20 to 80 weight percent titania forms an excellent conductor for holding an electrostatic charge. This specification references all compositions in weight percent, unless specifically noted otherwise. Most advantageously, the conductive ceramic includes alumina doped with about 30 to 60 weight percent titania. When applying doped ceramics, such as titania or zirconia doped alumina by thermal spray methods, micro-alloying the constituents can improve the uniformity of the electrode's conductivity.

The top plate may be either a dielectric or a conductor, depending upon the clamping force required. Most advantageously, the top plate is a conductor with a with a greater conductivity than the dielectric base. For example, a resistance on the order of about $10^9$ to $10^{11}$ Ohm·cm allows a slow current leakage through the top plate and it greatly increases the holding power of the chuck through the Johnsen-Rahbek effect. For example, yttria mixed with about 5 to 20 weight percent zirconia or alumina doped with about 5 to 20 weight percent titania provide a low conductivity material for slow leakage and enhanced clamping force.

A sealant or surface treatment advantageously alters the top surface to limit water adsorption. Most advantageously, the sealant is hydrophobic to further reduce polarization and electrically insulating for preventing electrostatic leakage. For example, organic or inorganic sealers can provide hydrophobic surfaces that minimize moisture adsorption. Various sealing materials can fill or seal the porosity; but the common sealing materials themselves may be slowly polarizable or even slightly conductive. In either case the chuck will lose its effectiveness. Most advantageously, the sealer is a hydrophobic silane or siloxane sealant for resisting polarization. Advantageously, the sealer reduces the chuck's surface energy to less than about 50 dynes/cm. In particular, silane with no outgassing has proven to be a most advantageous sealant.

Because small thermal or magnetic variations can alter the processed features of a wafer in metal-containing designs, the electrostatic clamp advantageously has an extreme flatness for holding the wafer flat during processing. In view of these requirements, the electrostatic clamp most advantageously uses a dielectric ceramic as a base, a conductive ceramic as an electrostatic charge holder and a ceramic top plate for supporting a workpiece. Using this all ceramic configuration limits large coefficient of thermal expansion differentials that can distort a chuck during thermal cycling. Furthermore, since there is almost no metallic or magnetic materials in the chuck design, charging and discharging the chuck does not produce any detrimental residual electrical fields that can delay clamping or declamping of the wafers. Methods for fabricating the ceramic materials include casting, sintering solid bodies and thermal spraying multiple layers to build up a ceramic.

Figure 1B:
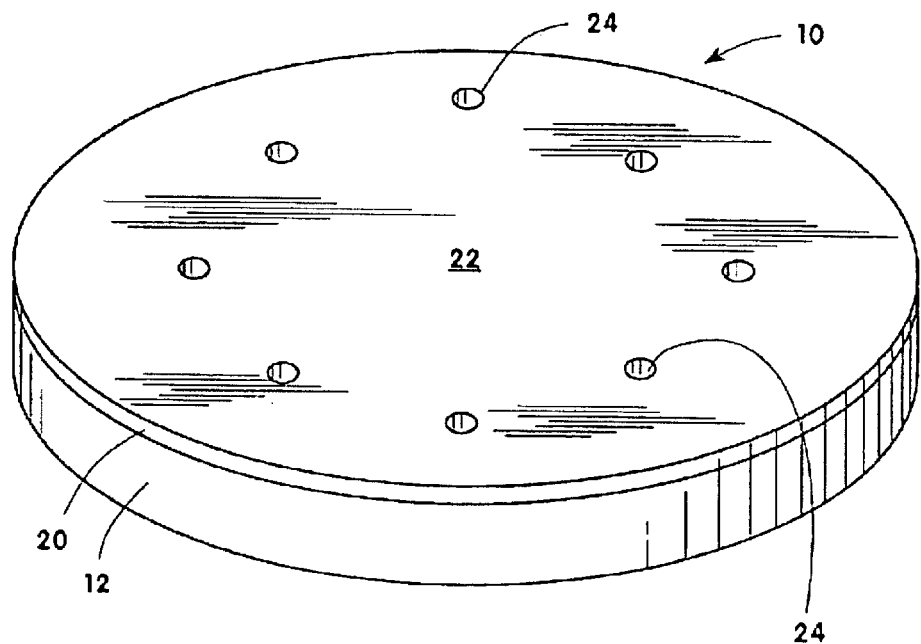
FIG. 1B is a perspective top view of the hybrid electrostatic chuck of FIG. 1A.

FIG. 1 illustrates a rapid charging and discharging hybrid chuck 10 of the invention. A dielectric base 12 contains conductive through contacts 14. Advantageously, brazing or adhesive bonding attaches contacts 14 to the dielectric base 12. These contacts 14 extend through the dielectric base 12 to form a connection between the top surface 15 and the bottom surface of the base 12. To limit eddy current generation during processing, it is advantageous to limit the size of the conductor pins to that sufficient for rapid charging and discharging.

Machining the top surface 15 of the dielectric leaves ribs 16 projecting above the surface by an amount equal to the desired thickness of the conducting electrodes 18. A typical conducting electrode has a thickness of about 0.006 inch (0.15 mm). The pattern of the ribs 16 is advantageously such that they form the boundaries of the two or more isolated pole electrodes. The ribs 16 illustrated produce a tri-polar design.

Then depositing a conductive non-metallic electrodes 18 covers at least a portion of the top surface 15 of the dielectric base. The thickness of the conductive layer 18 is advantageously greater than its desired final thickness. Then, planarizing the top surface 15 to reveal the ribs 16 effectively separates and isolates two or more conducting electrodes 18. Advantageously, the conductive material is a conductive ceramic. An advantageous ceramic conducting material to use is a composition of aluminum oxide/titanium oxide containing between about 30 and 50 weight percent titania.

In addition, depositing a ceramic layer 20 over the structure forms the top working surface 22 of the chuck. For example, plasma spraying is a suitable method for depositing the top working surface 22. Grinding or lapping the layer 20 are suitable techniques for forming the extremely flat working surface 22. The thickness of the deposited layer 20 should be greater than the desired final thickness to allow for the material lost in the final grinding or lapping operations. A suitable material for the top working surface 22 is high purity aluminum oxide having a thickness 0.005 to 0.007 inches (0.13 to 0.18 mm). The electrostatic chuck advantageously uses ports 24 for helium flow or for securing lifting pins to separate the wafer or other workpiece from the top ceramic layer 20. Most advantageously, the ports 24 consist of a series of ceramic openings for allowing helium to flow between the top layer 20 and a workpiece, such as a silicon wafer. Furthermore, the top layer 20 most advantageously contains channels for guiding the flow of the helium between the top layer 20 and the substrate.

Finally, an optional sealing material seals the porosity of the top layer 20 and thereby excludes moisture from the hybrid chuck. One appropriate sealing material is an epoxy. In addition to polymeric sealers, its possible to deposit thin CVD films on the top working layer. For example, depositing diamond-like coatings or alumina films on top of the dielectric thermal sprayed layer can seal the hybrid chuck. The presence of the thin films on top of the thick films provides a means to control moisture adsorption and also facilitates reducing any particulate generations for the thermal sprayed coatings.

The ceramic base member provides a highly insulating path between the two or more conductive electrodes. This prevents slow discharge from the dielectric electrostatic chuck during the periods when it has been disconnected from a dc power supply. In addition, the sealing material prevents discharge by the path through the top insulating layer 20 primarily by excluding adsorbed water from the internal porosity of the layer 20.

EXAMPLE

The testing data of this Example originate from a total of five tri-polar 200 mm hybrid electrostatic clamps. These hybrid chucks contained a dielectric alumina base produced by casting, sintering and machining to size. The alumina base had a purity of 97.6 weight percent and a resistance of about $10^{14}$ Ohm·cm. Thermal spraying a 0.006 in. (0.15 mm) conductive ceramic intermediate layer produced the conductor for holding a charge. This conductive layer consisted of alumina alloyed with about 35 weight percent titania and had a resistance of about $10^2$ Ohm·cm. The top layer contained 99.95 weight percent alumina thermally sprayed to a thickness of 0.006 in. (0.15 mm) on the conductive layer. This pure alumina had a resistance of about $10^{14}$ Ohm·cm. The total thickness of the hybrid chuck was 3/8 in. (9.5 mm) after final machining. After final machining, a stress-relief heat treatment of 4 to 6 hours at 800 to 1200° C. further improved the chuck's stability and improved flatness performance. Finally, after the stress relief treatment, a silane treatment rendered the hybrid chuck hydrophobic and reduced the chuck's surface energy to about 15 to 25 dynes/cm—for inorganic seal treatments that are resistant to high temperatures, the sealing may occur before the stress relief treatment. A vacuum chamber held at a minimum of 50 mTorr vacuum provided the chucks with a representative testing environment. Then placing the chucks on a temperature control block maintained the surface of the chuck at a testing temperature of −20° C., 23° C. or 50° C. Table 1 contains the helium flow rate for various clamping pressures.

TABLE 1

| | Temp. | | |
|---|---|---|---|
| Pressure Torr | +23° C. Flow sccm | +50° C. Flow sccm | −20° C. Flow sccm |
| 5 | 0.75 | 0.86 | 1.21 |
| 10 | 1.30 | 1.31 | 1.85 |
| 15 | 2.00 | 1.92 | 2.62 |
| 20 | 2.57 | 2.31 | 3.28 |
| 25 | 3.25 | 2.94 | 3.91 |
| 30 | 4.00 | 3.50 | 4.61 |

Figure 2:
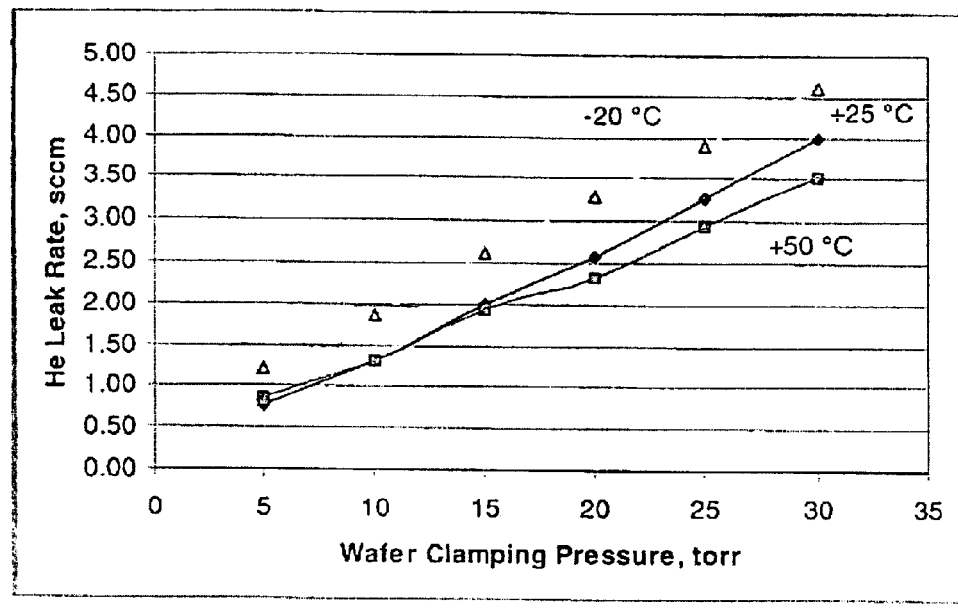
FIG. 2 is a plot of wafer clamping pressure and its associated helium leak rate for 200 mm silicon wafers in contact with a hybrid ceramic clamp at +/−800 volt.

Referring to FIG. 2, the electrostatic chucks with dielectric top layer provided excellent clamping presence with minimal helium leak rates.

To determine the charging characteristics of a hybrid electrostatic clamp, the poles on a 200 mm clamp were shorted and a step voltage of 1600 volts was applied in the presence of a wafer in contact with the top dielectric layer. The charge level was measured with an electrometer and a data acquisition system. Table 2 shows the time after the application of the voltage and the corresponding charge stored in the electrostatic clamp.

TABLE 2

| Dielectric Clamp | |
|---|---|
| Time, sec | Charge, Coulombs, 1E-7 |
| 0.002 | 0 |
| 0.004 | 20 |
| 0.006 | 40 |
| 0.008 | 80 |
| 0.01 | 100 |
| 0.012 | 110 |
| 0.014 | 115 |
| 0.016 | 118 |
| 0.018 | 118 |
| 0.02 | 120 |

TABLE 2-continued

| Dielectric Clamp | |
|---|---|
| Time, sec | Charge, Coulombs, 1E-7 |
| 0.2 | 120 |
| 0.4 | 121 |
| 0.6 | 121 |
| 0.8 | 121 |
| 1 | 121 |
| 2 | 121 |
| 3 | 121 |
| 4 | 121 |

Figure 3:
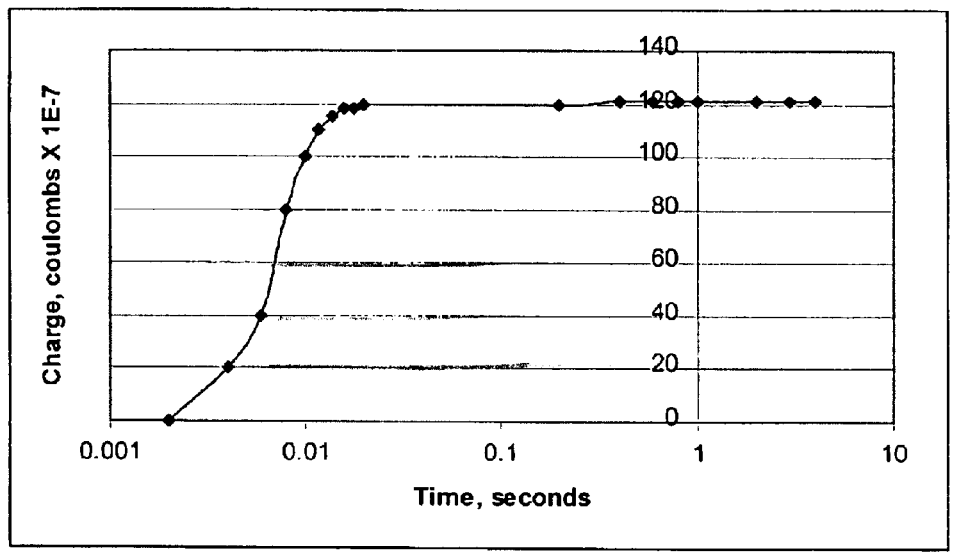
FIG. 3 is a plot of charging or clamping time for a silicon wafer and an applied voltage of 1600 volt.

Referring to FIG. 3, the ceramic clamp stores the charge rapidly and reaches a steady state in about 10 millisecond or faster. The clamping time was measured in terms of the increase in helium back pressure; and the declamping time was measured in terms of the increase in helium leak rate to more that 15 sccm. The rapid charging and discharging times was an equivalent measure of the wafer clamping and declamping times.

Applying an electrostatic charge of +/−800 volts adjacent a silicon wafer prepared the chucks for testing. The chuck sandwiched a thin layer of helium gas under the silicon wafer during testing. The discharge occurred through non-ferrous, non-magnetic titanium metal (Ti-6Al-4V) contacts as small as 0.020 inch (0.5 mm) diameter underneath the conductive ceramic layer of each pole. Table 3 illustrates the excellent release times achieved with the hybrid structure.

TABLE 3

| | Temp. | | |
|---|---|---|---|
| No. of Cycle | +25° C. Release Time Seconds | +50° C. Release Time Seconds | −20° C. Release Time Seconds |
| 1 | 0.66 | 0.65 | 0.69 |
| 2 | 0.66 | 0.70 | 0.74 |
| 3 | 0.65 | 0.69 | 0.74 |
| 4 | 0.64 | 0.71 | 0.74 |
| 5 | 0.65 | 0.68 | 0.76 |
| 6 | 0.66 | 0.69 | 0.73 |
| 7 | 0.66 | 0.64 | 0.72 |
| 8 | 0.63 | 0.66 | 0.73 |
| 9 | 0.64 | 0.67 | 0.76 |
| 10 | 0.65 | 0.66 | 0.74 |
| 11 | 0.65 | 0.66 | 0.74 |
| 12 | 0.63 | 0.65 | 0.71 |
| 13 | 0.67 | 0.65 | 0.74 |
| 14 | 0.66 | 0.69 | 0.76 |
| 15 | 0.66 | 0.68 | 0.77 |
| 16 | 0.67 | 0.68 | 0.74 |
| 17 | 0.66 | 0.69 | 0.75 |
| 18 | 0.63 | 0.70 | 0.75 |
| 19 | 0.65 | 0.67 | 0.76 |
| 20 | 0.63 | 0.75 | 0.75 |

Figure 4:
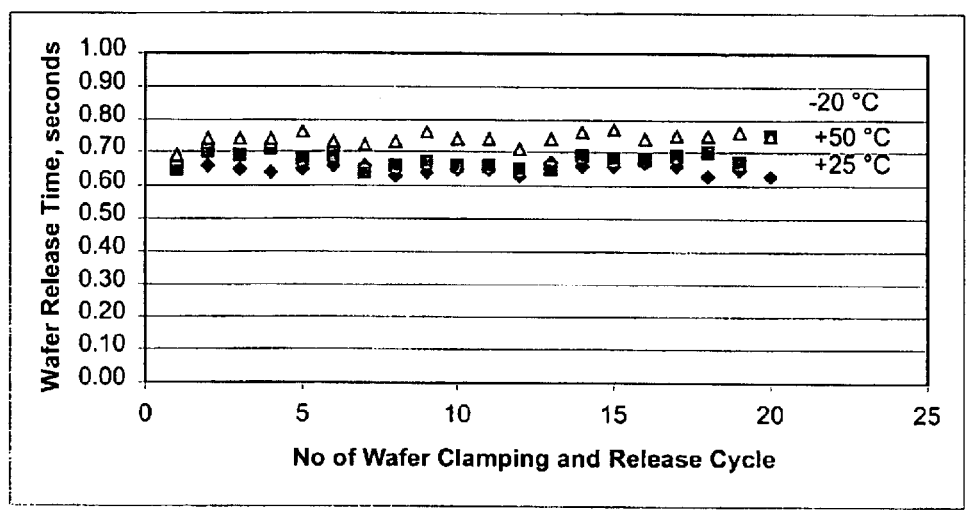
FIG. 4 is a plot of silicon wafer release time after removal of a +/−800 volt.

FIG. 4 illustrates the rapid release rates achieved for the chucks of the invention. Furthermore, FIG. 4 shows little, if any, polarization effect from the chuck's use over an extended time period.

Test samples were also prepared with the top layer containing pure alumina (dielectric with a resistance of about $10^{14}$ Ohm·cm) and alumina mixed with about 10 weight percent titania (conductive with a resistance of about $10^{10}$ Ohm·cm). The conductive clamps, relying upon the Johnsen-Rahbek effect, showed higher clamping pressure as compared to dielectric clamps (See Table 4 below). The conductive nature of the top ceramic layer did allow for improved dissipation of the charge upon removal of the power.

TABLE 4

| Type of Clamp | Dielectric (Top Layer resistivity > 10E12 Ohm-cm) | Conductive (Top Layer resistivity < 10E12 Ohm-cm) |
|---|---|---|
| Maximum Wafer Clamping Pressure, Torr | 40 | 80 |

In a number of semiconductor applications, it is advantageous to have an electrostatic clamp to hold a wafer for multiple processing steps. During this processing, the clamp must have extreme flatness to hold the wafer flat during any precision processing where small thermal or magnetic variations can alter the processed features. During thermal spray processing and machining, it is important to apply coatings and machine the coatings in a uniform manner. In addition, when producing a chuck by thermal spray methods, thermal spraying a layer on both sides of the chuck can cancel out thermal contraction forces to further improve flatness of the top layer.

In summary, the chuck provides a design that allows rapid charging and discharging. This device produces a several order of magnitude improvement in chuck charging time and about a one order of magnitude improvement in chuck discharge time. Furthermore, the dielectric device can operate for extended times in either a vacuum or in an air atmosphere. The all non-metallic design is resistant to particle generation and it achieves a high degree of substrate flatness during process variations where thermal expansions can distort the workpieces' flatness.

Many possible embodiments may be made of this invention without departing from the scope thereof, therefore it is understood that all matter set forth herein is to be interpreted as illustrative and in no manner limiting in any sense.

What is claimed is:

1. A hybrid chuck for securing workpieces with an electrostatic charge, the hybrid chuck comprising:
   a dielectric base for supporting the hybrid chuck, the dielectric base having a top surface;
   a conductive layer covering at least a portion of the top surface of the dielectric base, the conductive layer being conductive for receiving a current to create an electrostatic charge and being non-metallic for maintaining the electrostatic charge without significant eddy current losses in the presence of dynamic electromagnetic fields, and wherein the conductive layer includes at least two poles separated by a dielectric material; and
   a top working surface, the top working surface covering the conductive layer and being flat for holding workpieces upon the receiving of the current to create the electrostatic charge in the conductive layer.

2. The hybrid chuck of claim 1 including a hydrophobic surface treatment covering the top working surface for repelling moisture from the hybrid chuck.

3. The hybrid chuck of claim 1 wherein the dielectric base insulates the at least two poles of the conductive layer.

4. A hybrid chuck for securing workpieces with an electrostatic charge, the hybrid chuck comprising:
   a dielectric ceramic base for supporting the hybrid chuck, the dielectric ceramic base having a top surface;
   a conductive ceramic layer covering at least a portion of the top surface of the dielectric ceramic base, the conductive ceramic layer being conductive for receiving a current to create an electrostatic charge and being ceramic for maintaining the electrostatic charge without significant eddy current losses in the presence of dynamic electromagnetic fields, and wherein the conductive ceramic layer includes at least two Doles separated by an insulating material; and
   a top ceramic working surface, the top ceramic working surface covering the conductive ceramic layer and being flat for holding workpieces upon the receiving of the current to create the electrostatic charge in the conductive ceramic layer.

5. The hybrid chuck of claim 4 wherein the dielectric ceramic base is an alumina-base ceramic and the ceramic working surface is a conductor having a greater conductivity than the alumina-base ceramic.

6. The hybrid chuck of claim 4 including a hydrophobic surface treatment covering the insulating working surface for repelling moisture from the hybrid chuck.

7. The hybrid chuck of claim 6 wherein the hydrophobic surface treatment is selected from the group consisting of silane and siloxane coatings.

8. The hybrid chuck of claim 6 wherein the dielectric ceramic base insulates the at least two poles of the conductive ceramic layer.

9. A hybrid chuck for securing workpieces with an electrostatic charge, the hybrid chuck comprising:
   a dielectric ceramic base for supporting the hybrid chuck, the dielectric ceramic base having a top surface;
   a conductive ceramic layer covering at least a portion of the top surface of the dielectric ceramic base, the conductive ceramic layer being conductive for receiving a current to create an electrostatic charge and being ceramic for maintaining the electrostatic charge without significant eddy current losses in the presence of dynamic electromagnetic fields, and wherein the conductive ceramic layer includes at least two poles separated by an insulating material;
   a top ceramic working surface, the top ceramic working surface covering the conductive ceramic layer and being flat for holding workpieces upon the receiving of the current to create the electrostatic charge in the conductive ceramic layer; and
   a sealant covering the top ceramic working surface for protecting the top ceramic working surface from water adsorption.

10. The hybrid chuck of claim 9 wherein the dielectric ceramic base is an alumina-base ceramic and the ceramic working surface is a conductor having a greater conductivity than the alumina-base ceramic.

11. The hybrid chuck of claim 9 wherein the sealant is hydrophobic for repelling moisture from the hybrid chuck and electrically insulating for preventing electrostatic leakage.

12. The hybrid chuck of claim 11 wherein the sealant is selected from the group consisting of silanes and siloxanes.

13. The hybrid chuck of claim 9 wherein the dielectric ceramic base insulates the at least two poles of the conductive ceramic layer.

* * * * *